United States Patent [19]
Schaefer et al.

[11] Patent Number: 5,584,654
[45] Date of Patent: Dec. 17, 1996

[54] GAS TURBINE ENGINE FAN STATOR

[75] Inventors: Robert A. Schaefer, North Reading; Richard W. Laferriere, Topsfield, both of Mass.

[73] Assignee: General Electric Company, Cincinnati, Ohio

[21] Appl. No.: 577,072

[22] Filed: Dec. 22, 1995

[51] Int. Cl.$^6$ ..................................... F04D 29/54
[52] U.S. Cl. .................... 415/209.3; 415/209.4; 415/190
[58] Field of Search .............. 415/209.3, 209.4, 415/189, 190

[56] References Cited

U.S. PATENT DOCUMENTS

| | | | |
|---|---|---|---|
| 2,982,519 | 5/1961 | Haworth et al. | 415/209.4 |
| 2,994,508 | 8/1961 | Howald | 415/209.4 |
| 3,423,071 | 1/1969 | Noren | 415/209.4 |
| 3,849,023 | 11/1974 | Klompas | 415/209.4 |
| 3,867,065 | 2/1975 | Schaller et al. | 415/209.4 |
| 4,639,189 | 1/1987 | Rosman | 415/209.4 |
| 4,687,413 | 8/1987 | Prario | 415/190 |
| 5,176,496 | 1/1993 | Correia et al. | 415/190 |
| 5,492,445 | 2/1996 | Shaffer et al. | 415/209.3 |

FOREIGN PATENT DOCUMENTS

| | | | |
|---|---|---|---|
| 2113772 | 8/1983 | England | 415/209.4 |
| 2331893 | 1/1974 | Germany | 415/189 |

*Primary Examiner*—F. Daniel Lopez
*Assistant Examiner*—Mark Sgantzos
*Attorney, Agent, or Firm*—Andrew C. Hess; Wayne O. Traynham

[57] ABSTRACT

A fan stator includes a split outer casing having a pair of outer rails, and a pair of key slots disposed at a splitline thereof. A plurality of standard stator vanes have outer platforms and hooks which engage the casing rails for supporting the vanes, with the vanes also having inner hooks extending from inner platforms thereof. A pair of locking stator vanes are disposed at the casing splitline and include an outer platform having outer hooks which engage the casing rails, an anti-rotation key disposed in the casing key slot, and an inner platform having first and second locking hooks extending therefrom. The first locking hook is equal in size with the first inner hooks and includes a first dam blocking the first locking hook at one end thereof, and the second locking hook is axially shorter than the second inner hooks and includes a second dam blocking the second locking hook at the same end thereof. A plurality of arcuate standard shrouds includes a pair of inner rails engaging the vane inner hooks, and a pair of arcuate locking shrouds includes inner rails also engaging the vane inner hooks. The locking shroud rails have a pair of oppositely facing notches at one circumferential end thereof sized for receiving the dams of the locking vane. One of the locking shroud rails includes a blocking pin disposed in one of the notches which is sized to block differential circumferential movement with corresponding inner hooks of the standard vanes, while allowing differential circumferential movement with the axially shorter second hooks of the locking vanes.

11 Claims, 4 Drawing Sheets

000
GAS TURBINE ENGINE FAN STATOR

The U.S. Government has rights in this invention in accordance with Contract No. N00019-92C-0149 awarded by the Department of the Navy.

BACKGROUND OF THE INVENTION

The present invention relates generally to gas turbine engines, and, more specifically, to stator vanes therein.

In an aircraft gas turbine engine having a multi-stage fan assembly, stator vanes adjoin corresponding rotor blades for compressing air as it flows axially therethrough, with the compressed fan air being discharged from the engine for powering an aircraft in flight. In one conventional design, individual stator vanes have radially inner and outer platforms, each of which includes a respective pair of outer and inner hooks. The outer hooks support the vanes to a corresponding pair of outer rails extending circumferentially around an outer casing. The outer casing is typically split in two 180° halves, with the individual stator vanes being installed into each half by circumferentially sliding the outer hooks within the cooperating outer rails until each casing half is filled except for one remaining stator vane.

Since aerodynamic force encountered during operation of the fan creates a circumferential component of force, one specially configured locking vane is typically provided in each casing half to prevent circumferential rotation of all the vanes during operation. Accordingly, each casing half typically includes an axial recess or slot therein adjacent to the axial splitline, in which is disposed an anti-rotation key. The outer platforms of the locking vane and adjacent standard vane are correspondingly notched at adjoining sides thereof for accommodating the key, and against which the locking vane outer platform circumferentially abuts for preventing rotation during operation.

Since the adjoining outer platforms require complementary notches for receiving a portion of the key, the corresponding bending strength of the platforms is reduced. The circumferential component of the aerodynamic forces developed on the vanes during operation is reacted through the outer platforms and into the outer casing. The decreased bending strength significantly increases reaction bending stresses in the outer platforms which becomes a more significant concern for high solidity vanes wherein a greater number of circumferentially adjoining vanes must share a limited circumferential extent in the outer casing in which the aerodynamic forces are reacted. Since the platform end-notches are required for receiving the anti-rotation keys at two locations, all of the standard vane outer platforms are similarly notched on both sides for reducing unique parts count and reducing overall weight of the stator, and because the outer platform design is only as strong as the weakest platform, which is found at the locking vanes.

Although all the outer platforms are therefore identical, the locking vanes at the casing splitline are nevertheless unique and otherwise configured differently than the remaining standard vanes for effecting anti-rotation of the inner shrouds which are conventionally mounted on the inner platform hooks. The inner shrouds are typically arcuate segments which circumferentially adjoin each other to collectively form a ring, with each inner shroud having a corresponding pair of rails which engage the corresponding inner hooks of the vanes. After the standard vanes are initially assembled into each casing half during assembly, the individual inner shrouds are installed circumferentially along the corresponding inner hooks. The inner shrouds are typically identical in configuration and in circumferential length, except for one inner shroud in each casing half which is notched at one circumferential end in the corresponding rails thereof to define a special locking shroud that receives the specially configured inner hooks of corresponding locking vanes at the casing splitline position.

The inner hooks of the locking vanes are typically identical to those of the standard vanes except that they include integral dams or filled-in portions at one circumferential end thereof. The dams are radially aligned with the corresponding rails of the inner shrouds to prevent relative circumferential movement therebetween for thereby preventing circumferential rotation of the inner shrouds during operation of the engine. However, the locking shroud end notches are sized for receiving the locking vane dams. In this way, the standard inner shrouds are assembled to the inner hooks of the vanes in each casing half during assembly. The locking shroud is then similarly assembled to the inner hooks, leaving the notches thereof positioned adjacent to the casing splitline. The locking vane is then assembled with its corresponding anti-rotation key between the outer casing and the outer platform, and with the dams of the inner hooks being positioned within the notches provided in the locking shroud. The two casing halves are then assembled and bolted together to complete the assembly.

Omission of the anti-rotation features at the outer casing or inner shrouds is of course undesirable. Since the anti-rotation key is trapped between the outer platforms and the casing, it is hidden from view and omission thereof is not discernable after assembly. If a standard vane is assembled instead of the locking vane, both the vanes and inner shrouds will no longer be restrained from circumferential movement. Accordingly, it is desired to have an improved stator assembly which prevents incomplete assembly or misassembly during the assembly process.

SUMMARY OF THE INVENTION

A fan stator includes a split outer casing having a pair of outer rails, and a pair of key slots disposed at a splitline thereof. A plurality of standard stator vanes have outer platforms and hooks which engage the casing rails for supporting the vanes, with the vanes also having inner hooks extending from inner platforms thereof. A pair of locking stator vanes are disposed at the casing splitline and include an outer platform having outer hooks which engage the casing rails, an anti-rotation key disposed in the casing key slot, and an inner platform having first and second locking hooks extending therefrom. The first locking hook is equal in size with the first inner hooks and includes a first dam blocking the first locking hook at one end thereof, and the second locking hook is axially shorter than the second inner hooks and includes a second dam blocking the second locking hook at the same end thereof. A plurality of arcuate standard shrouds includes a pair of inner rails engaging the vane inner hooks, and a pair of arcuate locking shrouds includes inner rails also engaging the vane inner hooks. The locking shroud rails have a pair of oppositely facing notches at one circumferential end thereof sized for receiving the dams of the locking vane. One of the locking shroud rails includes a blocking pin disposed in one of the notches which is sized to block differential circumferential movement with corresponding inner hooks of the standard vanes, while allowing differential circumferential movement with the axially shorter second hooks of the locking vanes.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
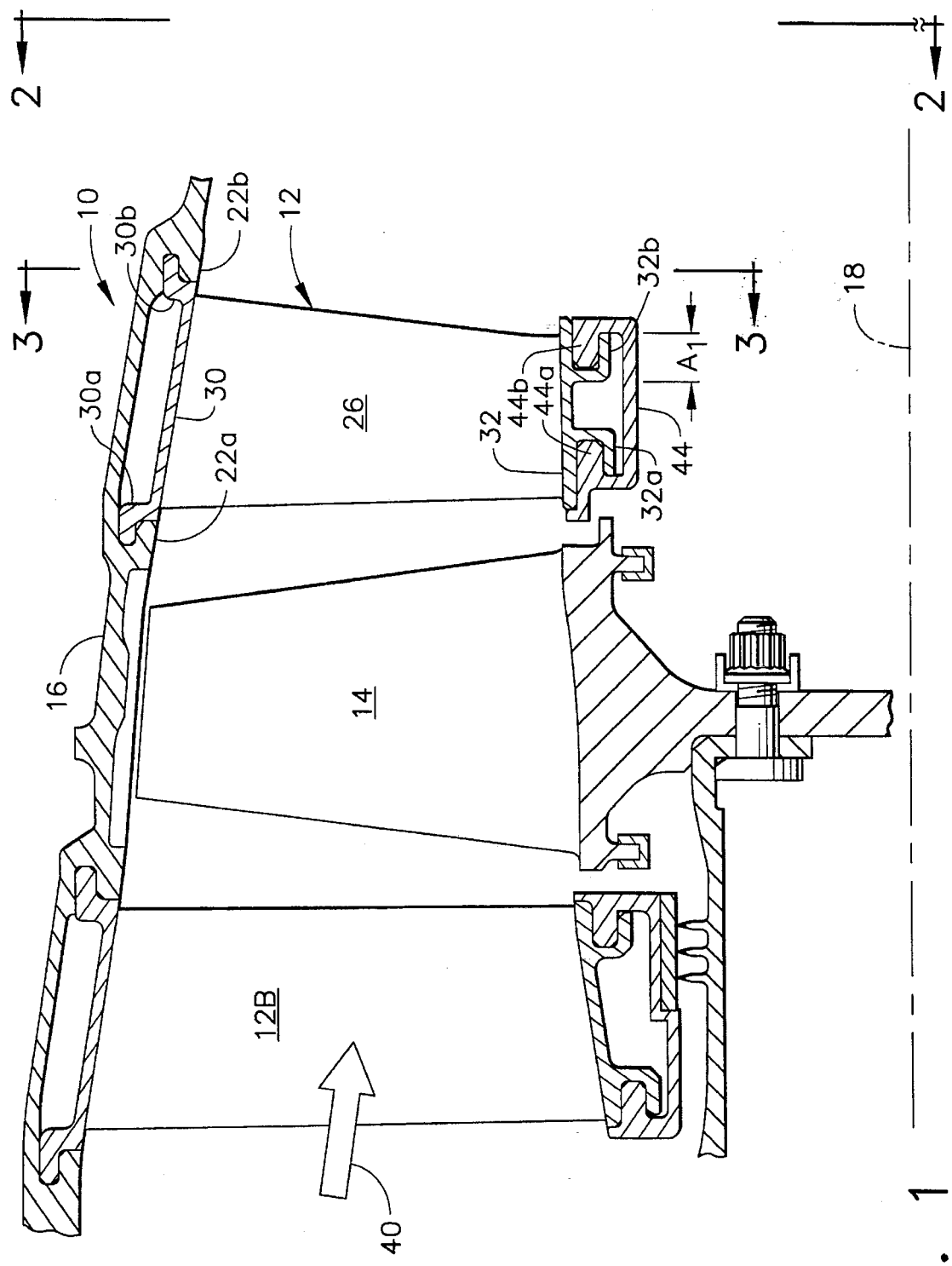
FIG. 1 is an elevational, partly sectional view of two fan stator stages of an aircraft gas turbofan engine in accordance with one embodiment of the present invention.

Illustrated in FIG. 1 is a portion of a fan assembly 10 of an exemplary gas turbofan engine configured for producing thrust for powering an aircraft in flight. The assembly 10 includes several stages of fan stators 12, 12B and fan rotors 14. In the exemplary embodiment illustrated in FIG. 1, fan stator 12B is a second stage component, with the fan stator 12 being a third stage component. One stage of the fan rotors 14 is illustrated between the two stators 12, 12B and conventionally includes a plurality of circumferentially spaced apart rotor airfoils extending outwardly from a rotor disk. The remaining rotors and stators are not illustrated.

The fan stators 12, 12B are assemblies of components configured in accordance with one embodiment of the present invention for providing effective Murphy-proofing during the assembly thereof for ensuring assembly of all required components while maintaining required anti-rotation therebetween. Since the second and third stage fan stators 12B, 12 are substantially identical to each other except for size, only the third stage fan stator 12 is described in more detail hereinbelow, with the second stage fan stator 12B being similarly configured.

Figure 2:
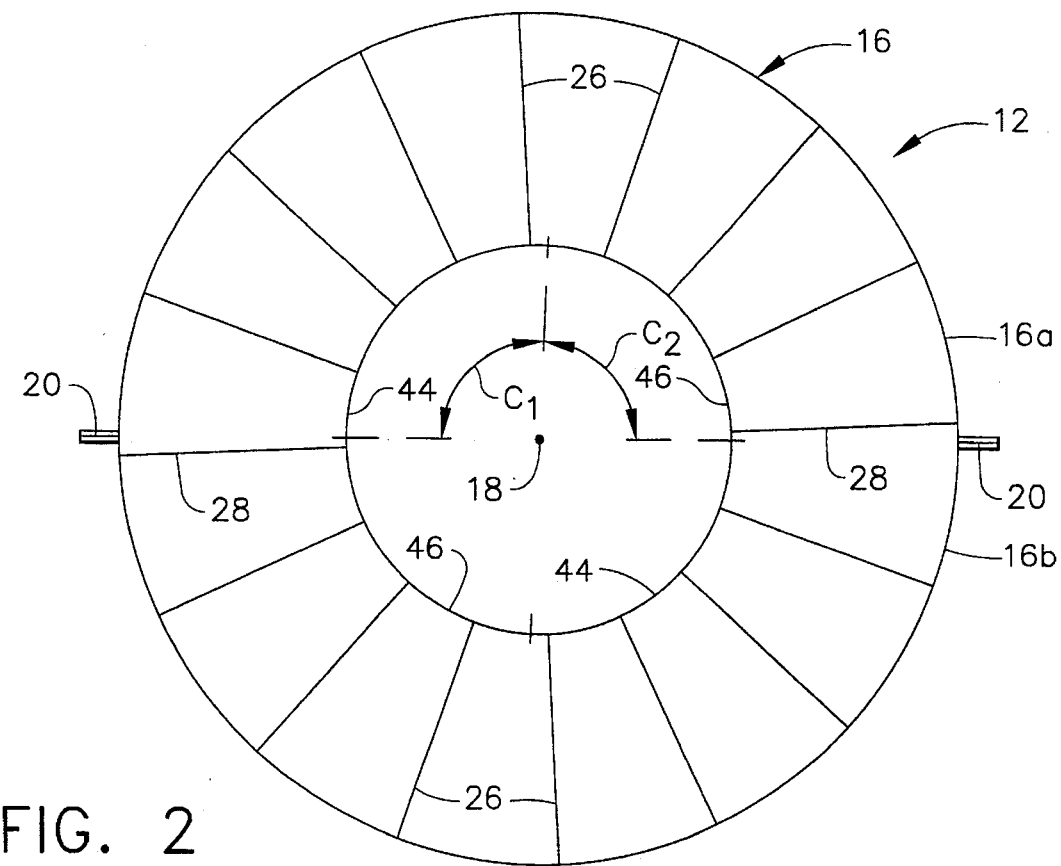
FIG. 2 is a schematic, axial sectional view through one of the fan stators illustrated in FIG. 1 and taken generally along line 2—2.

As shown in section in FIG. 1, and schematically in FIG. 2, the fan stator 12 includes a conventional annular outer casing 16 having an axial centerline axis 18. As shown in FIG. 2, the outer casing 16 is axially split in two casing halves 16a,b which form two 180° segments which are conventionally fixedly joined together at an axial splitline 20 defined by corresponding flanges which are bolted together to complete the entire 360° ring defining the outer casing 16.

Figure 3:
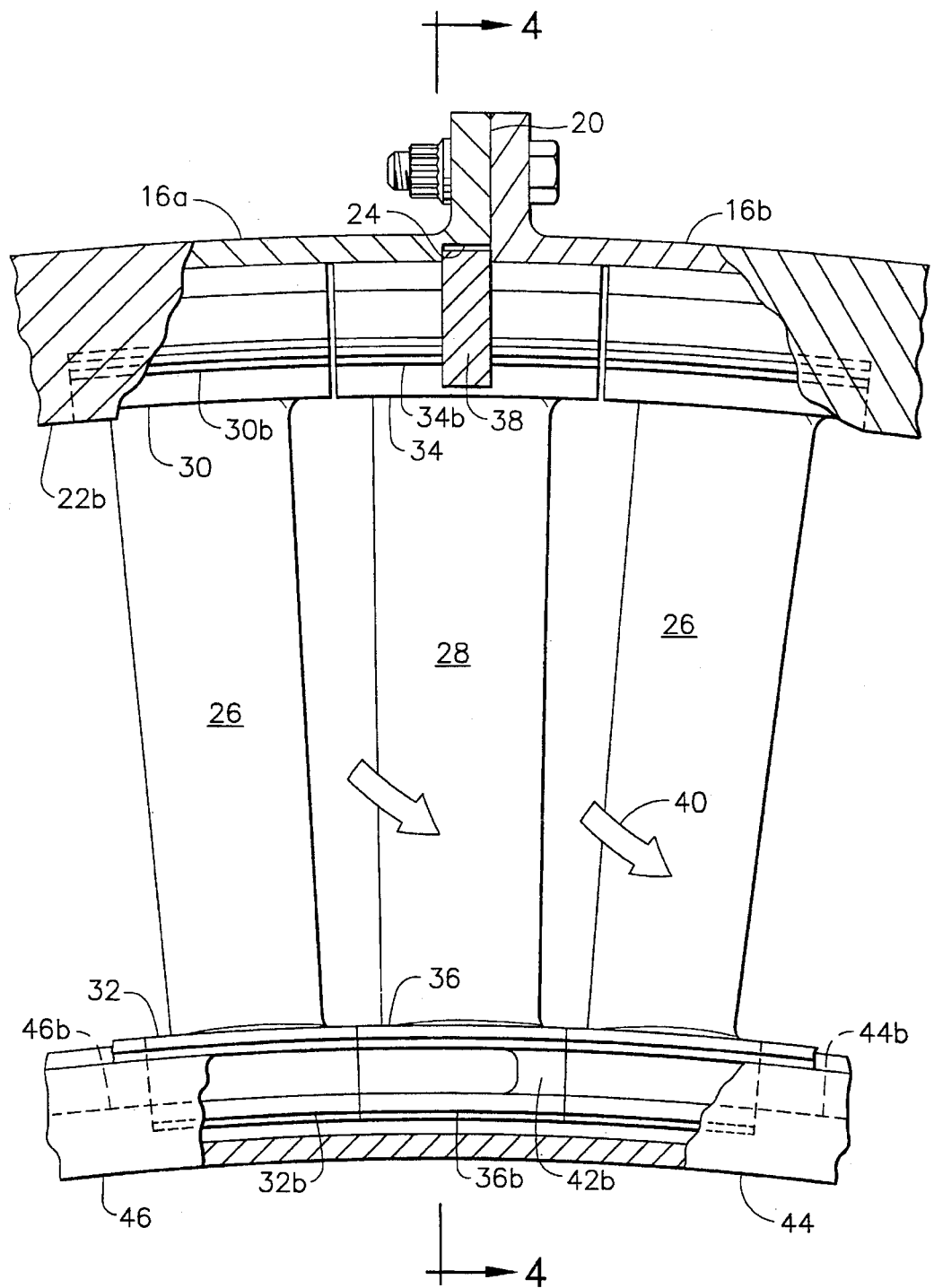
FIG. 3 is an elevational, partly sectional view of a portion of the aft fan stator illustrated in FIG. 1 and taken along line 3—3.

As shown in FIG. 1, the casing 16 includes first and second axially spaced apart outer support rails 22a,b which extend circumferentially around the inner diameter of the casing 16 in a conventional L-shaped configuration. As shown in FIG. 3, an axially extending key slot 24 is disposed radially in the casing first half 16a at the splitline 20, and an identical key slot 24 is similarly disposed in the splitline 20 diametrically oppositely at 180° therefrom in the second casing half 16b.

As shown in FIGS. 2 and 3, a plurality of primary or standard stator vanes 26 are circumferentially spaced apart from each other and extend radially inwardly from the outer casing 16. A pair of specifically modified standard vanes define locking stator vanes 28 disposed 180° apart at the casing splitline 20 and circumferentially adjoin respective ones of the standard vanes 26.

As shown in FIG. 1, the standard vanes 26 take the form of airfoils each including an integral radially outer platform 30 having first and second axially spaced apart radially outer hooks 30a,b which conventionally engage the first and second outer rails 22a,b, respectively for supporting the standard vanes from the casing 16, and the standard vanes 26 also include a radially inner platform 32 having first and second axially spaced apart inner hooks 32a,b.

Figure 4:
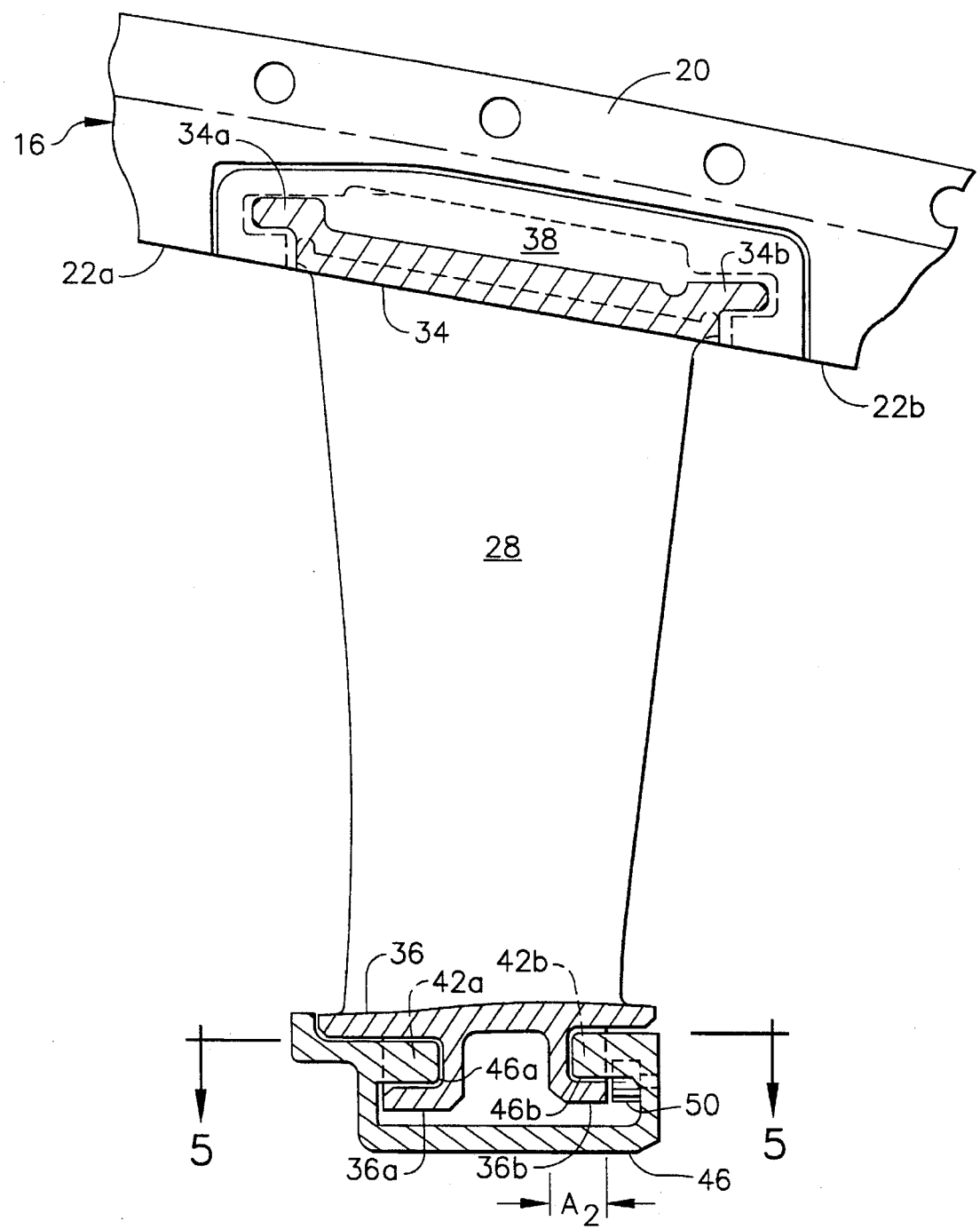
FIG. 4 is an elevational, side view of a locking vane and shroud joined to the fan stator casing illustrated in FIG. 3 and taken along line 4—4.

An exemplary one of the locking vanes 28 is illustrated in more particularity in FIG. 4 disposed at the casing splitline 20 and is also in the form of a conventional airfoil having a radially outer platform 34 and a radially inner platform 36. The outer platform 34 includes first and second axially spaced apart radially outer hooks 34a,b which engage the respective casing rails 22a,b in an identical configuration to that of the outer hooks 30a,b of the standard vanes 26 for supporting the locking vanes 28 from the casing 16.

As shown in FIGS. 3 and 4 in accordance with a preferred embodiment of the present invention, the outer platform 34 includes an anti-rotation axially extending key 38 which is disposed in the casing key slot 24 for preventing circumferential rotation of the locking vane 28, and in turn restrains the standard vanes 26 along the casing rails 22a,b during operation. During operation, air 40, as shown in FIGS. 1 and 3, flows between adjacent ones of the stator vanes 26, 28 and a circumferential component of aerodynamic force is developed in the vanes. In order to prevent circumferential rotation of the vanes along the casing rails 22a,b during operation, the anti-rotation key 38 circumferentially prevents the locking vanes 28, and in turn the standard vanes 26, from circumferential movement. The key 38 and its corresponding slot 24 may have any suitable configuration such as the generally rectangular sectional configuration illustrated in FIG. 3.

As shown in FIG. 4, the inner platform 36 of each locking vane 28 includes first and second axially spaced apart radially inner feet which define locking hooks 36a,b. The first locking hook 36a has the same axial transverse configuration as that of the first inner hook 32a of the standard vanes 26 illustrated in FIG. 1 and is sized axially equally therewith. The first locking hook 36a as illustrated in FIGS. 3 and 4 includes a first dam 42a which fills or blocks the first locking hook 36a at one circumferential end thereof being inboard from the splitline 20 of the casing half 16a in which it is disposed.

The second locking hook 36b as illustrated in FIG. 4 is generally similar in transverse configuration with the second inner hook 32b of the standard vanes 26 as illustrated in FIG. 1, except that it is axially shorter compared thereto and includes a second dam 42b. In FIG. 1, the axial length $A_1$ of the second inner hook 32b is illustrated, and the smaller axial length $A_2$ of the second locking hook 36b is illustrated in FIG. 4. The second dam 42b fills or blocks the second locking hook 36b at the same inboard circumferential end thereof like that of the first dam 42a.

Figure 5:
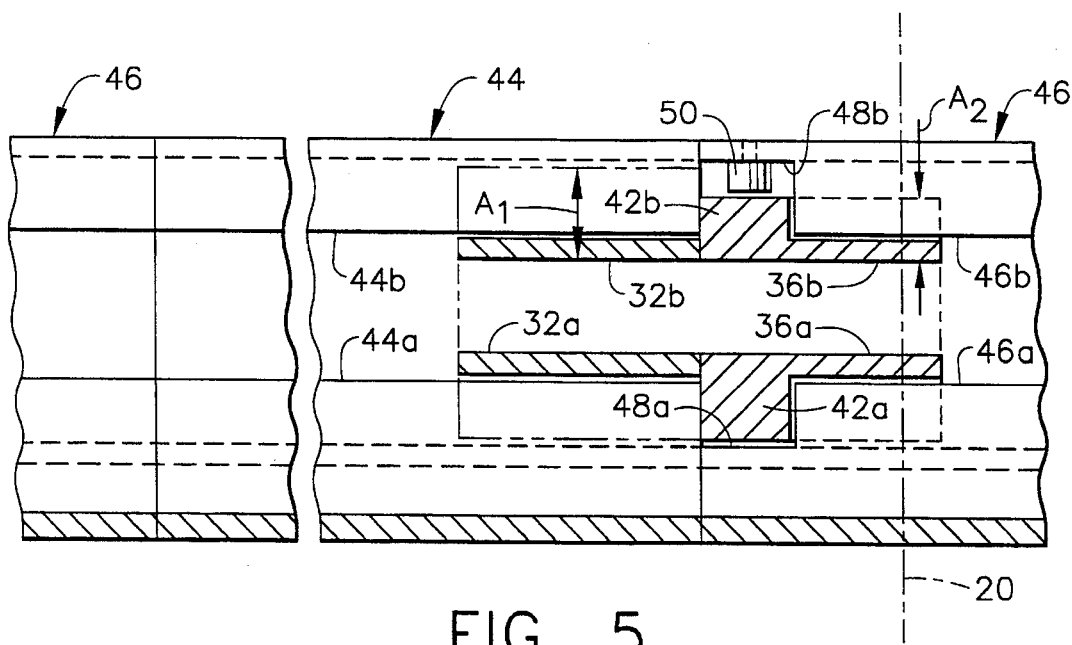
FIG. 5 is a top, partly sectional view of inner platforms and corresponding hooks of the standard and locking vanes illustrated in FIG. 4 assembled to corresponding standard and locking shrouds and taken generally along line 5—5.

Referring initially to FIGS. 1–3, the fan stator 12 further includes a plurality of arcuate primary or standard inner shrouds 44 which circumferentially adjoin a pair of arcuate locking shrouds 46 which collectively complete the entire 360° inner diameter of the fan stator 12. As shown in FIG. 1, the standard shrouds 44 each include first and second axially spaced apart inner rails 44a,b which engage the respective first and second inner hooks 32a,b of the standard vanes 26 for supporting the corresponding shrouds 44 thereto. Conventional U-shaped thin guide sectors (not shown) for reducing shroud wear are installed between the inner rails and inner hooks. As shown in FIG. 4, each of the locking shrouds 46 includes first and second axially spaced apart inner rails 46a,b which engage the respective first and second inner hooks 32a,b of the standard vanes 26 as shown in FIGS. 3 and 5. As shown in FIG. 5, the inner rails 46a,b of the locking shrouds 46 have first and second oppositely facing notches 48a,b at the outboard circumferential end thereof disposed at the casing splitline 20 which are sized for circumferentially receiving the first and second dams 42a,b of the respective locking vanes 28.

In the exemplary embodiment illustrated in FIGS. 4 and 5, the second inner rail 46b of the locking shroud 46 includes a blocking pin 50 disposed in the second notch 48b, and is axially sized to block differential circumferential movement with the second inner hooks 32b of the standard vanes 26, while allowing differential circumferential movement with the axially shorter second locking hooks 36b of the locking vanes 28.

During the assembly process of the fan stator 12 illustrated in FIG. 1, the individual standard vanes 26 are inserted in turn into each of the initially separated casing halves 16a,b by inserting the outer hooks 30a,b along the cooperating casing outer rails 22a,b from the splitline 20. After each casing half 16a,b is filled with the standard vanes 26, the standard shrouds 44 may then be assembled in each casing half by engaging the inner rails 44a,b thereof with the inner hooks 32a,b of the standard vanes 26 in a conventional manner. Each locking shroud 46 may then be circumferentially slid into position over the corresponding inner hooks 32a,b of the standard vanes 26 until the outboard notches 48a,b as illustrated in FIG. 5 are positioned adjacent to the casing splitline 20.

Each of the locking vanes 28 illustrated in FIGS. 3 and 4 may then be assembled to the respective casing halves 16a,b by engaging the outer hooks 34a,b with the corresponding outer rails 22a,b and then seating the key 38 in its mating slot 24 at the splitline 20. The outboard ends of the outer rail 22a,b at the splitline 20 may be suitably recessed as desired for allowing the key 38 to be seated fully in its corresponding slot 24.

As the outer hooks 34a,b of the locking vane 28 engage the outer rails 22a,b, the inner locking hooks 36a,b are positioned into the notches 48a,b provided therefor as illustrated in FIG. 5. The two casing halves 16a,b may then be assembled together at the splitline 20 and bolted together in a conventional manner.

The specially configured locking vanes 28 and locking shrouds 46 in accordance with the present invention ensure effective Murphy-proofing assembly of the fan stator 12 which will visibly reveal any missing components or substitution of incorrect components during the assembly process. The integral keys 38 and dams 42a,b of the locking vanes 28 shown in FIGS. 4 and 5 prevent the insertion of a locking vane 28 at any position other than at the cooperating key slots 24 and notches 48a,b. Since the aft or second locking hooks 36b of the locking vanes 28 as illustrated in FIG. 4 are axially shorter than the corresponding aft or second inner hooks 32b of the standard vanes 26 as illustrated in FIG. 1, only the locking vane 28 will be able to clear the blocking pin 50. In this way, a standard vane 26 cannot be inserted in the circumferential outboard end of the locking shroud 46 since the blocking pin 50 prevents engagement therebetween. Without the blocking pin 50, a standard vane 26 could be improperly installed in the locking position since the locking shroud 46 must be suitably configured for engaging the standard vanes 26 at all remaining positions therealong except for the circumferential outboard position reserved for the locking vane 28.

Since conventional locking shrouds and standard shrouds are typically equal in circumferential length, care must be taken to ensure that both are utilized and assembled into their correct positions. In accordance with another feature of the present invention, the locking shrouds 46 as illustrated in FIG. 2 are preferably different in circumferential length than that of the standard shrouds 44 to provide an additional measure of distinguishing between the two components. In a preferred embodiment, each of the standard shrouds 44 has a circumferential length $C_1$, and each of the locking shrouds 46 has a circumferential length $C_2$ which is preferably less than or shorter than the standard shrouds 44. The standard shrouds 44 and locking shrouds 46 are preferably symmetrically disposed in each of the casing halves 16a,b with abutting ends disposed at the casing splitline 20.

In a simple, basic embodiment each casing half 16a,b includes only one locking shroud 46 and corresponding locking vane 28, and at least one of the standard shrouds 44 and a suitable number of standard vanes 26. In the four shroud embodiments illustrated in FIG. 2, the standard shrouds 44 each have a circumferential length $C_1$ which is preferably only slightly greater than 90°. The corresponding locking shrouds 46 are suitably less than 90° in circumferential length $C_2$ to collectively equal 180° in each casing half 16a,b. In this way, if two standard shrouds 44 were attempted to be assembled in each casing half 16a,b, a visible portion of one of the standard shrouds 44 would project abnormally outward from the splitline 20 indicating incorrect assembly. Only when one standard shroud 44 and one locking shroud 46 are assembled in each casing half 16a,b will the outboard ends of the shrouds align with the mating stator half indicating correct assembly thereof. A similar visual observation will also occur in a different design having more than two shrouds provided in each casing half 16a,b as long as the locking shrouds are designed to be smaller in circumferential length than the equal length standard shrouds.

Since the two differently sized standard and locking shrouds 44, 46 ensure correct visual installation thereof during assembly, then only the locking vane 28, and not a standard vane 26, may then be installed in the outboard vane position at the splitline 20.

In the preferred embodiment illustrated in FIG. 4, the key 38 is preferably integrally joined to the outer platform 34 of the locking shroud 28 as either a separately produced component which may be suitably joined thereto by tack welding for example, or the key 38 may be integrally formed and machined with the outer platform 34 during the manufacturing process. With the key 38 being fixedly joined to the locking vane 28, its assembly in the outer casing 16 is ensured along with the necessity of installing the corresponding locking vane 28 in its correct position at the splitline 20.

As shown in FIG. 3, the key 38 is preferably joined to the outer platform 34 substantially equidistantly between the circumferential opposite ends thereof in the middle region of the platform 34 in the vicinity of the platform longitudinal neutral bending axis. This is significant firstly since bending stresses induced by circumferential aerodynamic loading are minimal in the region of the platform longitudinal neutral axis in the center of the platform 34, and secondly because the otherwise required notches at the circumferential ends of the platform 34, as are conventionally provided, may be eliminated. As indicated above in the Background section, the end notches typically used in a conventional outer platform significantly reduce the bending strength capability of the outer platform, which is of particular interest in high solidity designs wherein the circumferential lengths of the platforms 34 are limited by and about equal to the circumferential pitch between the adjacent vanes.

In the embodiment wherein the outer platform 34 is notched for receiving the key 38, providing the notch in the center of the platform 34 therefore eliminates the need for the end notches not only in the locking vane 28 itself but in all the standard vanes 26 as well. In this way, the entire circumferential extent of each of the outer platforms of the standard and locking vanes 26, 28 may be fully used for reacting the circumferential bending loads experienced during operation. In an embodiment wherein the key 38 is integrally formed with the outer platform 34 in a common one-piece component, no significant stress concentration is provided at this location, and since this location is the platform longitudinal bending neutral axis, the stresses are inherently low.

Accordingly, in the preferred embodiment as illustrated in FIG. 3, the outer platforms 30 of the standard vanes 26 are preferably circumferentially continuous without notches between circumferentially opposite ends thereof. And, all adjacent ones of the outer platforms 30 of the standard vanes 26 and outer platforms 34 of the adjoining locking vanes 28 are preferably coextensive with each other without notches at the adjacent joints.

The improved fan stator 12 disclosed above provides a Murphy-proofed assembly system which ensures inclusion of these various anti-rotation features, which in turn ensures proper anti-rotation of the vanes and shrouds during engine operation. The improved outer platforms 30, 34 of the standard and locking vanes 26, 28 lowers the reaction loads in the outer hooks 30a,b and 34a,b, and therefore results in lowered peak stresses therein. By designing to an acceptable peak stress, lighter weight vane designs can be made for a given individual vane application in view of the increased bending strength provided by the improved outer platforms of the present invention.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A gas turbine engine fan stator comprising:
    an outer casing including two casing halves fixedly joined together at a splitline; first and second axially spaced apart outer rails; and a pair of axially extending key slots disposed at said splitline;
    a plurality of standard stator vanes each including a radially outer platform having a first and second axially spaced apart outer hooks engaging said outer rails, respectively, for supporting said standard vanes from said casing; and a radially inner platform having first and second axially spaced apart inner hooks;
    a pair of locking stator vanes disposed at said casing splitline and each including:
        a radially outer platform having first and second axially spaced apart radially outer hooks engaging said outer rails, respectively, for supporting said locking vanes from said casing;
        an axially extending key disposed in respective ones of said casing key slots for preventing circumferential rotation of said locking vanes, and in turn said standard vanes, along said outer rails; and
        an inner platform having first and second axially spaced apart locking hooks; said first locking hook being sized equally with said first inner hooks and including a first dam blocking said first locking hook at one end thereof; and said second locking hook being axially shorter than said second inner hooks and including a second dam blocking said second locking hook at one end thereof;
    a plurality of arcuate standard shrouds each including first and second inner rails engaging said first and second inner hooks of said standard vanes; and
    a pair of arcuate locking shrouds each including first and second inner rails engaging said first and second inner hooks of said standard vanes; said inner rails having first and second oppositely facing notches at one circumferential end thereof sized for receiving said first and second dams of said locking vanes, respectively; and said second inner rail of each of said locking shrouds including a blocking pin disposed in said second notch and being axially sized to block differential circumferential movement with said second inner hooks of said standard vanes, while allowing differential movement with said axially shorter second hooks of said locking vanes.

2. A fan stator according to claim 1 wherein said locking shrouds are different in circumferential length than said standard shrouds.

3. A fan stator according to claim 2 wherein said locking shrouds are circumferentially shorter than said standard shrouds.

4. A fan stator according to claim 3 wherein said standard and locking shrouds are symmetrically disposed in each of said casing halves.

5. A fan stator according to claim 4 wherein each casing half includes only one each of said locking shroud and locking vane, and one of said standard shrouds.

6. A fan stator according to claim 5 wherein said standard shrouds are greater than 90° in circumferential length.

7. A fan stator according to claim 2 wherein said key is integrally joined to said outer platform of each of said locking vanes.

8. A fan stator according to claim 7 wherein said key is joined to said outer platform substantially equidistantly between circumferentially opposite ends thereof.

9. A fan stator according to claim 7 wherein said outer platforms of said standard vanes are circumferentially continuous without notches between circumferential opposite ends thereof.

10. A fan stator according to claim 7 wherein all adjacent ones of said outer platforms of said standard and locking vanes are coextensive.

11. A locking stator vane for engaging a pair of outer rails of an outer casing of a gas turbine engine fan stator comprising:

an airfoil;

an outer platform joined to a top of said airfoil and having first and second axially spaced apart outer hooks for engaging said outer rails, respectively, for supporting said locking vane from said casing;

an axially extending key for being disposed in a corresponding key slot in said casing for preventing circumferential rotation of said locking vanes along said outer rails; and an inner platform joined to a bottom of said airfoil and having first and second axially spaced apart locking hooks; and wherein said key is integrally joined to said outer platform substantially equidistantly between circumferentially opposite ends thereof.

* * * * *